United States Patent [19]

Maierhofer

[11] 4,319,898
[45] Mar. 16, 1982

[54] LOUVER GREASE FILTER

[75] Inventor: Max Maierhofer, Germantown, Wis.

[73] Assignee: Air Filter Corporation, Milwaukee, Wis.

[21] Appl. No.: 246,031

[22] Filed: Mar. 20, 1981

[51] Int. Cl.³ .......................................... B01D 50/00
[52] U.S. Cl. ...................................... 55/322; 55/323;
   55/325; 55/332; 55/444; 55/488; 55/501;
   55/525; 55/DIG. 31; 55/DIG. 36; 55/DIG. 37
[58] Field of Search ................................ 55/321–323,
   55/325, 332, DIG. 36, DIG. 37, DIG. 31, 444,
   482, 488, 501, 525

[56] References Cited

U.S. PATENT DOCUMENTS

| | | | |
|---|---|---|---|
| 2,361,186 | 10/1944 | Fishbein et al. | 55/DIG. 37 X |
| 2,537,217 | 1/1951 | Farr | 55/488 |
| 3,274,759 | 9/1966 | Bell, Jr. | 55/482 |
| 3,381,679 | 5/1968 | Gonzalez | 55/DIG. 36 X |

Primary Examiner—Kathleen J. Prunner
Attorney, Agent, or Firm—Quarles & Brady

[57] ABSTRACT

A filter for removing airborne grease has spaced front and rear walls each with a series of transverse louvers extending into the interior of the filter and opening downwardly. A filter media of expanded metal sheets is sandwiched between the front and rear walls.

7 Claims, 5 Drawing Figures

LOUVER GREASE FILTER

BACKGROUND OF THE INVENTION

This invention relates to grease filters, and more particularly to a filter which removes airborne grease particles.

A considerable hazard is created by airborne grease particles exiting an exhaust stack. The airborne grease particles are created in abundance from restaurant cooking equipment. If not removed from the air, the grease will collect on the sides of exhaust ducts and the exhaust stack. If this happens a flare up on a grill, range, fryer or other cooking equipment can touch off a serious fire in the grease in the ductwork and stack. Airborne grease in the ductwork can also settle on the ventilating fans and motors for such fans resulting in a reduction in efficiency of the ventilating equipment.

Grease filters are employed at the entrance to the ductwork to alleviate the potential hazards. The filters provide surfaces on which the airborne grease particles will collect and the collected grease will drain away. The air entering the ductwork thereby has at least the heavy greases removed from it. One form of grease filter now in use consists of a series of layers of an expanded metal media some of which are corrugated. The air is forced to follow a tortuous path and in so doing the suspended grease particles attach themselves to the surfaces of layers of expanded metal. Such form of grease filter does an effective job of removing grease particles from the air but does less well in retarding a flame from shooting through the filter from the grill below. Another form of filter in use is fabricated from two layers of semicircular cylindrical baffles which are arranged in alternate directions so that the air does not have a direct path through the filter. This baffle filter has the semicircular cylindrical baffles arranged vertically and the grease which collects on their surfaces drains down to the bottom of the filter where it exists through drain holes and is collected in a trough for removal. This latter form of filter is particularly useful for preventing a flame from passing beyond a certain point into the ductwork beyond the filter. Because its surface area is limited, it functions less well to remove the airborne grease.

Any such grease filter must present a relatively low static pressure across its thickness so as to minimize the size of the blowers needed to evacuate the ductwork and therefore to minimize the energy consumed. Such filters should also be cleanable so that they can be reused.

By my invention I provide a simple and relatively inexpensive grease filter which functions to effectively remove the airborne grease and also to retard flames from shooting through the filter.

SUMMARY OF THE INVENTION

In accordance with the invention there is provided a grease filter having spaced front and back louvered walls with filter media disposed between the front and back walls, the louvers of the two walls being offset from each other along the axis of air movement so as to force the air to travel a tortuous path.

Further in accordance with the invention, such a grease filter has the filter media formed from sheets of expanded metal including a flat sheet adjacent the front wall and a serpentine sheet between the flat sheet and the rear wall.

It is a principal object of the invention to provide an effective but relatively inexpensive grease filter which traps airborne grease particles and prevents flame-through.

It is another object of the invention to provide such a filter which not only traps but drains the trapped grease particles for collection in a trough.

The foregoing and other objects of the invention will appear in the detailed description which follows. In the description reference is made to the drawings which illustrate a preferred embodiment of the invention.

DETAILED DESCRIPTION OF THE PREFERRED EMBODIMENT

Figure 1:
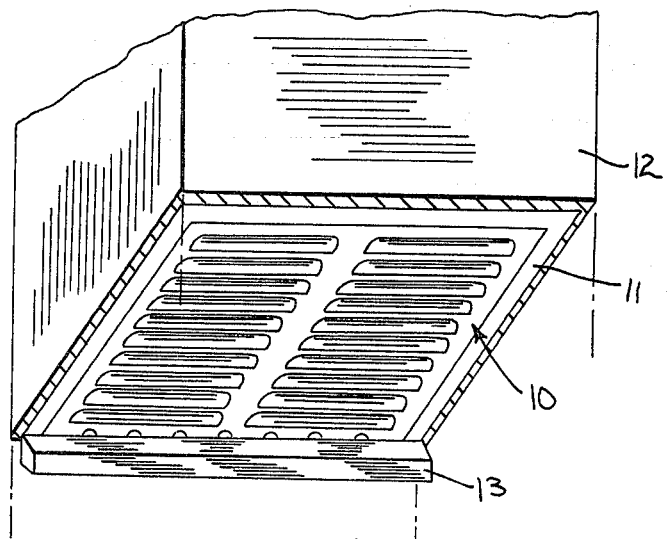
FIG. 1 is a view in perspective showing a filter in accordance with this invention installed in an exhaust hood.
Figure 2:
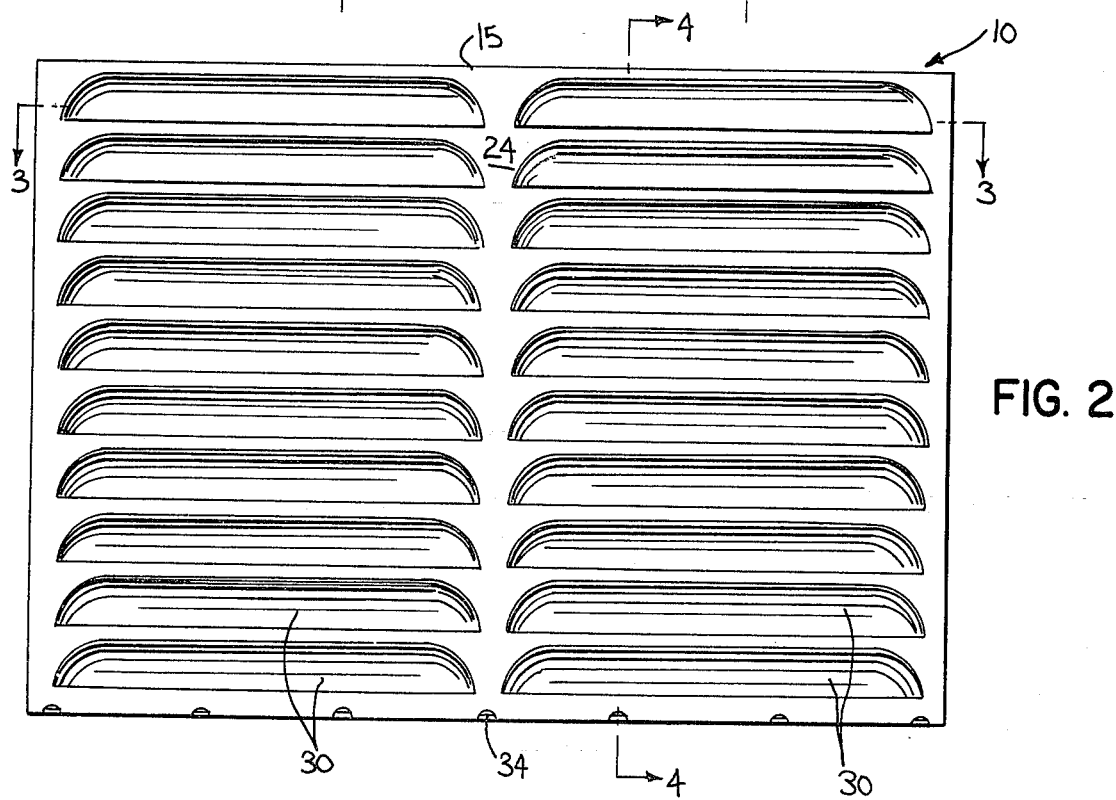
FIG. 2 is a front view in elevation of the filter in accordance with the invention.
Figure 3:
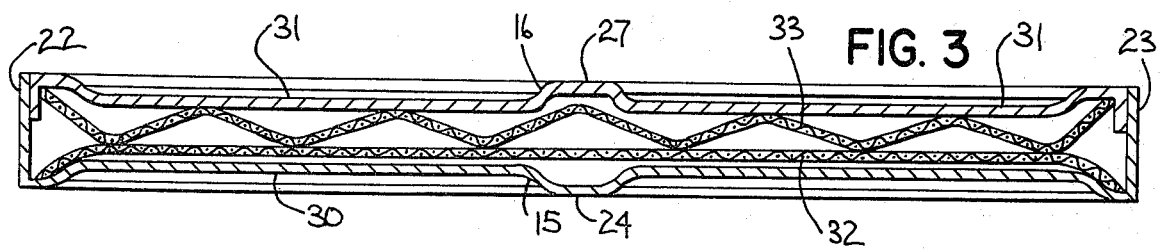
FIG. 3 is a view in horizontal cross-section taken in a plane of line 3—3 of FIG. 2.
Figure 4:
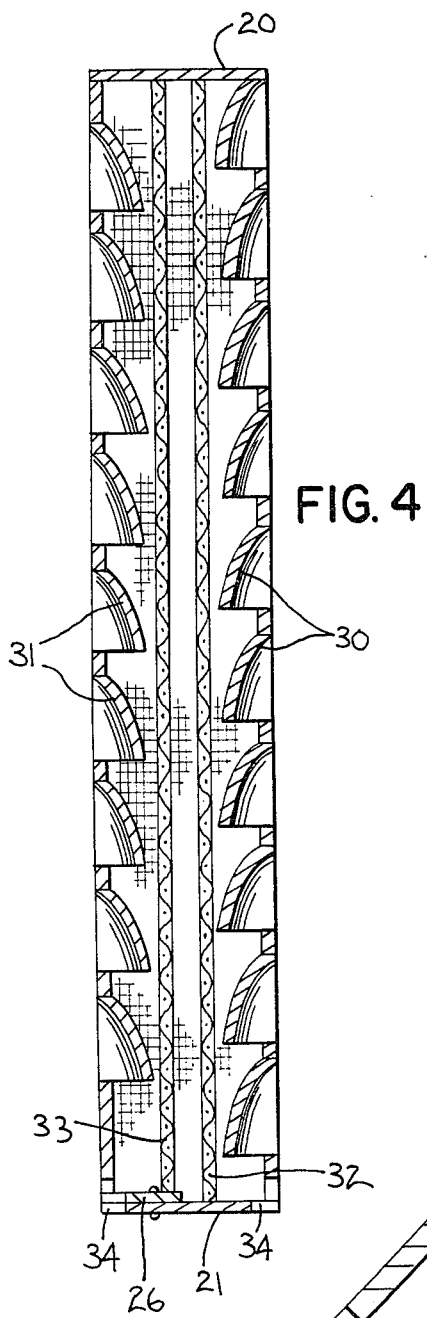
FIG. 4 is a view in vertical cross-section taken in a plane of the line 4—4 of FIG. 2.

As shown in FIG. 1, the grease filter designated generally by the reference numeral 10 is typically mounted at an inclined angle to the vertical, such as 45°, in a framework 11 at the entrance to an exhaust hood 12 of an exhaust system. The filter 10 would be mounted in a position above a grill or other cooking equipment in a kitchen. A trough 13 is mounted along the lowest edge of the air filter 10 to collect the grease which is trapped on the air filter 10.

The filter 10 is generally rectangular in configuration and has spaced front and rear walls 15 and 16, respectively. The front wall 15 has top and bottom and lateral side portions 20, 21, 22, and 23, respectively, formed integral with it and projecting rearwardly from the front face 24 of the front wall 15. The rear wall 16 has short lateral sections (e.g. bottom section 26) at its peripheral edges projecting forward from the rear face 27 of the rear wall 16 and seated inside of the side portions 20 through 23 of the front section. The side portions 20 through 23 are joined to the lateral sections as by rivets 28.

The front wall 15 has two side-by-side series of transverse louvers 30 which project inwardly to the interior of the filter 10 from the plane of the front face 24. The louvers 30 open downwardly into the interior as viewed from the front of the filter 10. The rear wall 16 is provided with a similar pair of series of louvers 31 which also project inwardly from the plane of the rear face 27. The louvers 31 in the rear wall 16 also open downwardly into the interior of the filter 10.

Filter media is disposed within the space between the front and rear walls 15 and 16, respectively. The filter media takes the form of two sheets of expanded metal. A first sheet 32 is generally flat and is mounted immediately inside the inner surfaces of the louvers in the front wall 15. A second expanded metal sheet 33 is formed into a generally serpentine shape and it is sandwiched between the flat sheet 32 and the inner surfaces of the louvers of the rear wall 16. The axes of the folds which define the peaks and valleys of the second expanded metal sheet 33 extend in a vertical direction within the filter 10. Drain holes 34 are provided along the lower front and rear edges of the bottom of the filter. The drain holes identify the bottom of the filter.

Figure 5:
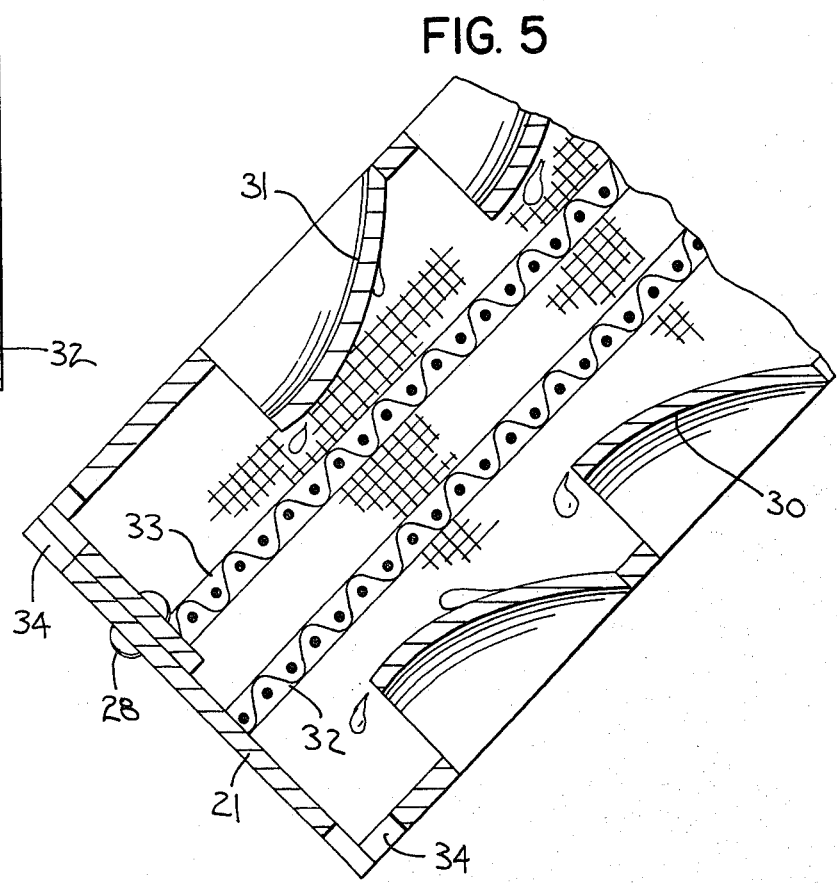
FIG. 5 is a partial view in vertical cross-section similar to FIG. 4 but to an enlarged scale and showing the filter in a functioning attitude.

In operation, air is drawn by a blower (not shown) within the ductwork through the filter 10 and it first encounters the front wall 15 and passes through the louvers 30 therein. The path of the air will be redirected as it passes through the front wall 15. The air must then pass through the two sheets 32 and 33 of expanded metal and thence out of the louver openings 31 in the rear wall 16. As shown in FIG. 5, the air must travel through a tortuous path as it passes from the front face 24 of the filter to the rear face 27. In so doing, the air encounters surfaces of the louvers 30 and 31 and of the expanded metal filter media within the filter and airborne grease particles will be deposited on those surfaces. Since the air filter is mounted at an acute angle from the vertical, the grease which collects will flow downwardly towards a bottom edge and out a drain hole 34. The grease will fall along the rear surfaces of the louvers 30 in the front wall 15 and along the front surfaces of the louvers 31 in the rear wall 16, as shown in FIG. 5. The design of the louvers in the front and rear walls 15 and 16 is such that with the filter installed at an angle such as 45° from the vertical the grease trapped inside will flow within the filter and will not fall back into the area beneath the filter, such as the food grill over which the filter is located.

The filter in accordance with the present invention is very effective in preventing the transmission of a flame for any distance through the filter thereby reducing the danger that a flame from a grill or other cooking equipment beneath the filter will reach accumulated grease within the ductwork above the filter. Although the air is forced to travel a tortuous path through the filter, the louvers allow the blower to draw the air uniformally through the filter. The static loss across the filter is minimal.

The filter walls and sides can be constructed from sheet galvanized steel, stainless steel or aluminum formed into their desired shape by typical stamping operations. The expanded metal media within the filter can similarly be formed from galvanized steel, stainless steel or aluminum. Typically, the same material would be used for both the walls, sides and filter media.

I claim:

1. A grease filter comprising:
    spaced front and rear walls each having a series of transverse louvers extending inwardly into the space between the walls,
    the series of louvers in the rear wall being offset from the series of louvers in the front wall along the axis of air movement through said filter so that air must travel an indirect path through said filter; and
    filter media disposed in the space between said front and rear walls.

2. A grease filter in accordance with claim 1 wherein said filter media are sheets of expanded metal sandwiched between said front and rear walls.

3. A grease filter comprising:
    spaced front and rear walls joined together at their perimeter so as to define a top, bottom and sides,
    said walls each having a series of transverse louvers extending into the space between the walls from the plane of the exterior face of each wall,
    the louvers of each series opening downwardly and the series of louvers in the rear wall being offset from the series of louvers in the front wall along the axis of air movement through the filter; and
    filter media disposed in the space between said front and rear walls.

4. A grease filter in accordance with claim 3 wherein said filter media are expanded metal sheets disposed in said space.

5. A grease filter in accordance with claim 4 wherein one expanded metal sheet is disposed adjacent the interior of said front wall and a second expanded metal sheet is serpentine in configuration and is sandwiched between said one sheet and rear wall, the peaks and valleys of said serpentine sheet extending from top to bottom.

6. A grease filter in accordance with claim 3 wherein drain holes are formed at the bottom of the filter.

7. A filter for airborne grease particles which is disposed in a plane which is at an acute angle from the vertical, said filter comprising:
    spaced front and rear walls joined together by lateral portions at the perimeter of the walls,
    said front wall having a series of downwardly opening transverse louvers which project inwardly from the plane of the exterior front face of said front wall into the space between said walls,
    said rear wall having a series of downwardly opening transverse louvers which project inwardly from the plane of the exterior rear face of said rear wall into the space between said walls, the series of louvers of said rear wall being offset from the series of louvers of said front wall relative to the principal path of air movement toward and away from said filter so that the air is forced to follow a tortuous path from said front face to said rear face,
    drain openings being formed in and disposed adjacent the bottom of said walls; and
    a filter media disposed within the space between said front and rear walls.

* * * * *